(12) United States Patent
Li et al.

(10) Patent No.: US 11,069,324 B1
(45) Date of Patent: Jul. 20, 2021

(54) DISPLAY DEVICE AND DISPLAY METHOD BACKGROUND OF THE DISCLOSURE

(71) Applicant: WUHAN CHINA STAR OPTOELECTRONICS TECHNOLOGY CO., LTD, Hubei (CN)

(72) Inventors: Man Li, Hubei (CN); Sijie Yang, Hubei (CN); Bowen Ye, Hubei (CN)

(73) Assignee: WUHAN CHINA STAR OPTOELECTRONICS TECHNOLOGY CO., LTD, Hubei (CN)

( * ) Notice: Subject to any disclaimer, the term of this patent is extended or adjusted under 35 U.S.C. 154(b) by 492 days.

(21) Appl. No.: 16/307,146

(22) PCT Filed: Sep. 29, 2018

(86) PCT No.: PCT/CN2018/108695
§ 371 (c)(1),
(2) Date: Dec. 5, 2018

(87) PCT Pub. No.: WO2020/042272
PCT Pub. Date: Mar. 5, 2020

(30) Foreign Application Priority Data

Aug. 31, 2018 (CN) .......................... 201811007981.7

(51) Int. Cl.
*G09G 5/14* (2006.01)
*H04N 5/225* (2006.01)
(Continued)

(52) U.S. Cl.
CPC ............. *G09G 5/14* (2013.01); *G06F 1/1626* (2013.01); *G06F 1/1686* (2013.01); *G09G 2360/14* (2013.01); *H04M 1/0264* (2013.01); *H04M 2201/42* (2013.01); *H04M 2250/52* (2013.01); *H04N 5/2257* (2013.01); *H04N 5/23299* (2018.08)

(58) Field of Classification Search
CPC combination set(s) only.
See application file for complete search history.

(56) References Cited

U.S. PATENT DOCUMENTS

| 2012/0127137 A1* | 5/2012 | Kim .......................... G09G 5/00 345/204 |
| 2013/0135328 A1* | 5/2013 | Rappoport ............ G06F 3/0481 345/522 |

(Continued)

FOREIGN PATENT DOCUMENTS

| CN | 102646696 A | 8/2012 |
| CN | 106878564 A | 6/2017 |

(Continued)

*Primary Examiner* — Phung-Hoang J Nguyen
(74) *Attorney, Agent, or Firm* — Soroker Agmon Nordman

(57) ABSTRACT

A display device and a display method are provided. The display device includes a display screen, and wherein the display screen includes a first displaying area and a second displaying area. The first displaying area is in a non-displaying state when a main control system receives a specific signal for driving a recognizing module, and the first displaying area is in a displaying state when the main control system does not receive the specific signal for driving the recognizing module.

13 Claims, 2 Drawing Sheets

(51) Int. Cl.
*H04N 5/232* (2006.01)
*G06F 1/16* (2006.01)
*H04M 1/02* (2006.01)

(56) References Cited

U.S. PATENT DOCUMENTS

| | | | |
|---|---|---|---|
| 2014/0055718 A1 | 2/2014 | Li | |
| 2017/0280033 A1 | 9/2017 | Yu et al. | |
| 2018/0129246 A1* | 5/2018 | Ko | G06F 1/1616 |
| 2018/0260079 A1 | 9/2018 | Zhang | |
| 2018/0336851 A1* | 11/2018 | Hidaka | G09G 3/3258 |
| 2019/0004595 A1* | 1/2019 | Mizuno | G06F 3/1446 |

FOREIGN PATENT DOCUMENTS

| | | |
|---|---|---|
| CN | 107231512 A | 10/2017 |
| CN | 108254963 A | 7/2018 |
| CN | 208737809 U | 4/2019 |

\* cited by examiner

DISPLAY DEVICE AND DISPLAY METHOD BACKGROUND OF THE DISCLOSURE

BACKGROUND OF THE DISCLOSURE

1. Field of the Disclosure

The present disclosure relates to the field of display technology, and more particularly, to a display device and a display method.

2. Description of the Related Art

Along with the development of display panel technology, there is an increasing demand for a display device with a large screen. A user feels more comfortable with a larger screen which provides a better visual experience when playing a video game and watching a video.

At present, terminal equipment for mobile communication, such as handheld phones, PADs and the like, usually uses three types of display screens:

(1) an ordinary display screen whose a frame has a wider black edge, wherein the position of the black edge is used for arranging sensors like a front camera, an earphone, an optical distance sensor, etc.; (2) a standard full screen whose improved screen ratio by compressing any one of black edges or any two of black edges and adjusting the selection or the position of components like the front camera, the earphone, the optical distance sensor, etc. based on the design of the aforesaid ordinary display screen; (3) a shaped screen which provides a specific position to arrange sensors like a camera, the earphone, the optical distance sensor, etc. through cutting specific shapes in parts of the displaying area of the screen.

In the third solution, it sacrifices the completeness of the displaying areas of the display screens without realizing the maximum utilization of the display screens, and also increases the manufacturing cost of the display screens. In addition, the user's visual experience is affected by the asymmetry of the shaped screen.

Therefore, the following technical solution is proposed in the present disclosure according to the foregoing technical problem.

SUMMARY

To improve the inferior visual experience from the conventional display devices, a display device and a display method are provided in the present disclosure.

To realize the foregoing object, the present disclosure proposes a technical solution as follows:

A display device, proposed in the present disclosure, including:

a housing; a display screen, which is located on a surface of the housing, includes a first displaying area and a second displaying area; a recognizing module which is located between the housing and the display screen; a main control system which is located between the housing and the display screen; wherein the first displaying area is in a non-displaying state when the main control system receives a specific signal for driving the recognizing module, and the first displaying area is in a displaying state when the main control system does not receive the specific signal for driving the recognizing module.

In the present disclosure, the display device further includes a first driving chip and a second driving chip, and wherein the first driving chip is configured for receiving a first signal which is sent from the main control system and is used for driving the first displaying area to display an image, and the second driving chip is configured for receiving a second signal which is sent from the main control system and is used for driving the second displaying area to display the image.

In the present disclosure, the display device further includes a sliding module which is connected to the recognizing module; and wherein the sliding module renders the recognizing module to move toward the display screen when the main control system receives the specific signal for driving the recognizing module.

In the display device of the present disclosure, an orthogonal projection of the recognizing module lies within the first displaying area, wherein the recognizing module is selected from at least one of a front camera, an infrared camera and a light sensing element.

In the display device of the present disclosure, the first displaying area has a shape of one of a square shape, a rectangle shape or an ellipse shape, wherein the first displaying area is a transparent area.

In the display device of the present disclosure, the first displaying area is disposed near a frame edge area of the display device.

A method of displaying in a display device, proposed in the present disclosure, including:

providing a display device, wherein the display device includes a housing, a display screen, a recognizing module and a main control system, and wherein both the recognizing module and the main control system are located between the housing and the display screen, and the display screen is located on a surface of the housing and includes a first displaying area and a second displaying area; and detecting, by the main control system, if receives a specific signal for driving the recognizing module; wherein the first displaying area is in a non-displaying state when the main control system receives a specific signal for driving the recognizing module, and the first displaying area is in a displaying state when the main control system does not receive the specific signal for driving the recognizing module.

In the method of the present disclosure, the display device further includes a first driving chip and a second driving chip, wherein the first driving chip is configured for receiving a first signal which is sent from the main control system and is used for driving the first displaying area to display an image, and the second driving chip is configured for receiving a second signal which is sent from the main control system and is used for driving the second displaying area to display the image.

In the method of the present disclosure, the display device further includes a sliding module which is connected to the recognizing module, wherein the sliding module renders the recognizing module to move toward the display screen when the main control system receives the specific signal for driving the recognizing module.

In the method of the present disclosure, an orthogonal projection of the recognizing module lies within the first displaying area, wherein the recognizing module is selected from at least one of a front camera, an infrared camera and a light sensing element.

A display device, further proposed in the present disclosure, including:

a housing; a display screen, which is located on a surface of the housing, includes a first displaying area and a second displaying area; a recognizing module which is located between the housing and the display screen; a main control system which is located between the housing and the display screen; wherein the first displaying area is in a non-displaying state when the main control system receives a specific signal for driving the recognizing module, and the first displaying area is in a displaying state when the main control system does not receive the specific signal for driving the recognizing module; and wherein the display device further includes a first driving chip and a second driving chip, and wherein the first driving chip is configured for receiving a first signal which is sent from the main control system and is used for driving the first displaying area to display an image, and the second driving chip is configured for receiving a second signal which is sent from the main control system and is used for driving the second displaying area to display the image.

In the present disclosure, the display device further includes a sliding module which is connected to the recognizing module, wherein the sliding module renders the recognizing module to move toward the display screen when the main control system receives the specific signal for driving the recognizing module.

In the display device of the present disclosure, an orthogonal projection of the recognizing module lies within the first displaying area, wherein the recognizing module is selected from at least one of a front camera, an infrared camera and a light sensing element.

In the display device of the present disclosure, the first displaying area has a shape of one of a square shape, a rectangle shape or an ellipse shape, wherein the first displaying area is a transparent area.

In the display device of the present disclosure, the first displaying area is disposed near a frame edge area of the display device.

Through arranging a first displaying area at the surface of the display screen for displaying permanently, the present disclosure realizes the benefit of increasing the utilization of the non-displaying area of the display screen and improving the user's visual experience.

BRIEF DESCRIPTION OF THE DRAWINGS

In order to more clearly illustrate the embodiments of the present disclosure or technical solutions in the current technologies, the figures required for describing of the embodiments or the current technologies will be briefly introduced below. It is obvious that the following drawings are merely some embodiments of the present disclosure, a person having ordinary skill in this field can obtain other figures according to these figures under the premise of not paying creative works.

DETAILED DESCRIPTION OF THE EMBODIMENTS

The following embodiments are described with reference to the accompanying drawings, which exemplify the realization of the invention. The directional terminologies of the invention, such as "top", "bottom", "front", "back". "left", "right", "inner", "outer", "side" and the like are merely the directions with reference to the accompanying drawings. Therefore, the aforesaid directional terminologies are used to describe and comprehend the invention without limiting the invention. In the following drawings, the units having similar structures are marked by same numerals.

Figure 1:
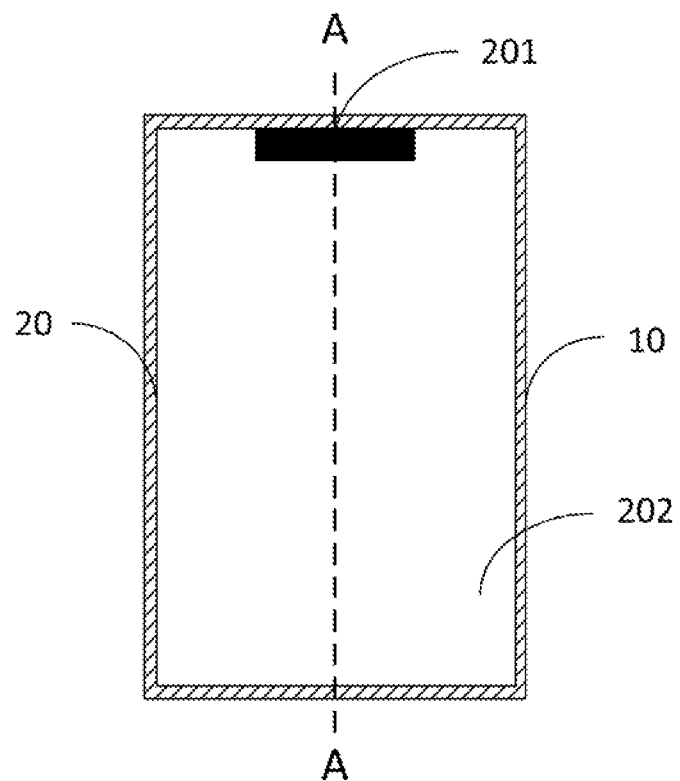
FIG. 1 is a top view of a display device according to an embodiment of the present invention.

Please refer to FIG. 1, which is a top view of a display device according to an embodiment of the present invention. The display device includes a housing 10, a display screen 20, a recognizing module and a main control system, wherein the display screen 20 is located on a surface of the housing 10, and both the recognizing module and the main control system are located between the housing 10 and the display screen 20.

The display screen 20 includes a first displaying area 201 and a second displaying area 202. In an embodiment, the first displaying area 201 is a transparent area, namely a user can see a structure of a module located in the first displaying area 201 when the display device is turned off.

In an embodiment, the first displaying area 201 is in a non-displaying state when the main control system receives a specific signal for driving the recognizing module, and the first displaying area 201 is in a displaying state when the main control system does not receive the specific signal for driving the recognizing module.

The first displaying area 201 is in a displaying state when the display device works. In an embodiment, the first displaying area 201 is used to display time, a date, a network status of the display device, or any other content with letters, etc.

The main control system receives the specific signal for driving the recognizing module, causing the first displaying area 201 to be in a non-displaying state, when the user uses the recognizing module of the display device. In an embodiment, the recognizing module can be embodied as, without limitation, at least one of a front camera, an infrared camera and a light sensing element.

For instance, the front camera will be used when the user takes a selfie or uses a facial recognition function. At the same time, the first displaying area 201 receives a predetermined signal, causing the first displaying area 201 to be in a non-displaying state and the front camera works.

In an embodiment, in order to realize the image displaying of the display device, the main control system is mainly used for converting a data signal, a control signal and a clock signal from the outside into the ones which are suitable for a Data Driven Integrated Circuit (S-IC) and a Scan Driven Integrated Circuit (G-IC).

In an embodiment, the display device further includes a first driving chip and a second driving chip, wherein the first driving chip is configured for receiving a first signal which is sent from the main control system and is used for driving the first displaying area 201 to display an image, and the second driving chip is configured for receiving a second signal which is sent from the main control system and is used for driving the second displaying area 202 to display the image.

When the user uses the recognizing module of the display device, the main control system receives the specific signal for driving the recognizing module and outputs the first signal to the first driving chip corresponding with the first displaying area 201, causing the first displaying area 201 to be in the non-displaying state.

Figure 2:
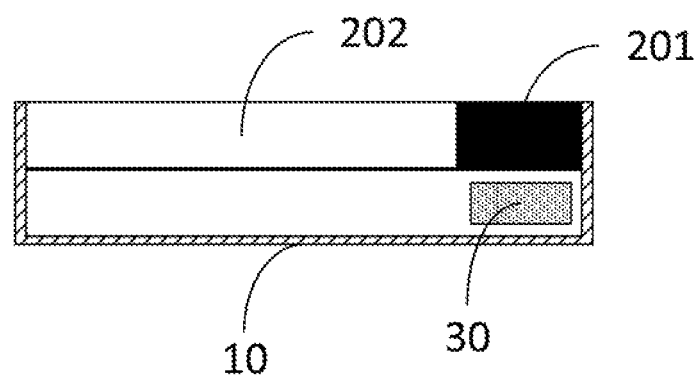
FIG. 2 is a cross-sectional view along line A-A of the display device shown in FIG. 1.

Please refer to FIG. 2, which is a cross-sectional view along line A-A of the display device shown in FIG. 1. The recognizing module 30 is located in the first displaying area 201, wherein an orthogonal projection of the recognizing module 30 lies within the first displaying area 201 of the display screen 20.

The first displaying area 201 can have, without limitation, a shape of one of a square shape, a rectangle shape or an ellipse shape. In an embodiment, the first displaying area 201 can have a regular rectangle shape.

In an embodiment, the first displaying area 201 is disposed near a frame edge area of the display device. Please refer to FIG. 1, the first displaying area 201 lies in the middle of the top side area of the display device. The first displaying area 201 may also lie in one side of the top side area of the display device.

In an embodiment, the display device further includes a sliding module (not shown) which is connected to the recognizing module 30, wherein the sliding module renders the recognizing module 30 to move toward the display screen 20 when the main control system receives the specific signal for driving the recognizing module 30.

In an embodiment, the first displaying area 201 can be disposed at any position of the display screen 20, without being limited to the forgoing embodiment.

The front camera will be used when the user takes a selfie. At the same time, the first displaying area 201 receives a predetermined signal, causing the first displaying area 201 to be in a non-displaying state. In addition, the sliding module renders the front camera to move toward the display screen 20 after receiving the signal with regard to the utilization of the front camera, so that the front camera can have a wider viewing range to enhance the scope of taking photographs; or when the infrared camera is used, the measuring accuracy of the infrared camera is improved because the distance between the infrared camera and the user is reduced.

In an embodiment, the first displaying area 201 can be a non-transparent area using the same material as the second displaying area 202 used, without being limited to a transparent area.

Figure 3:
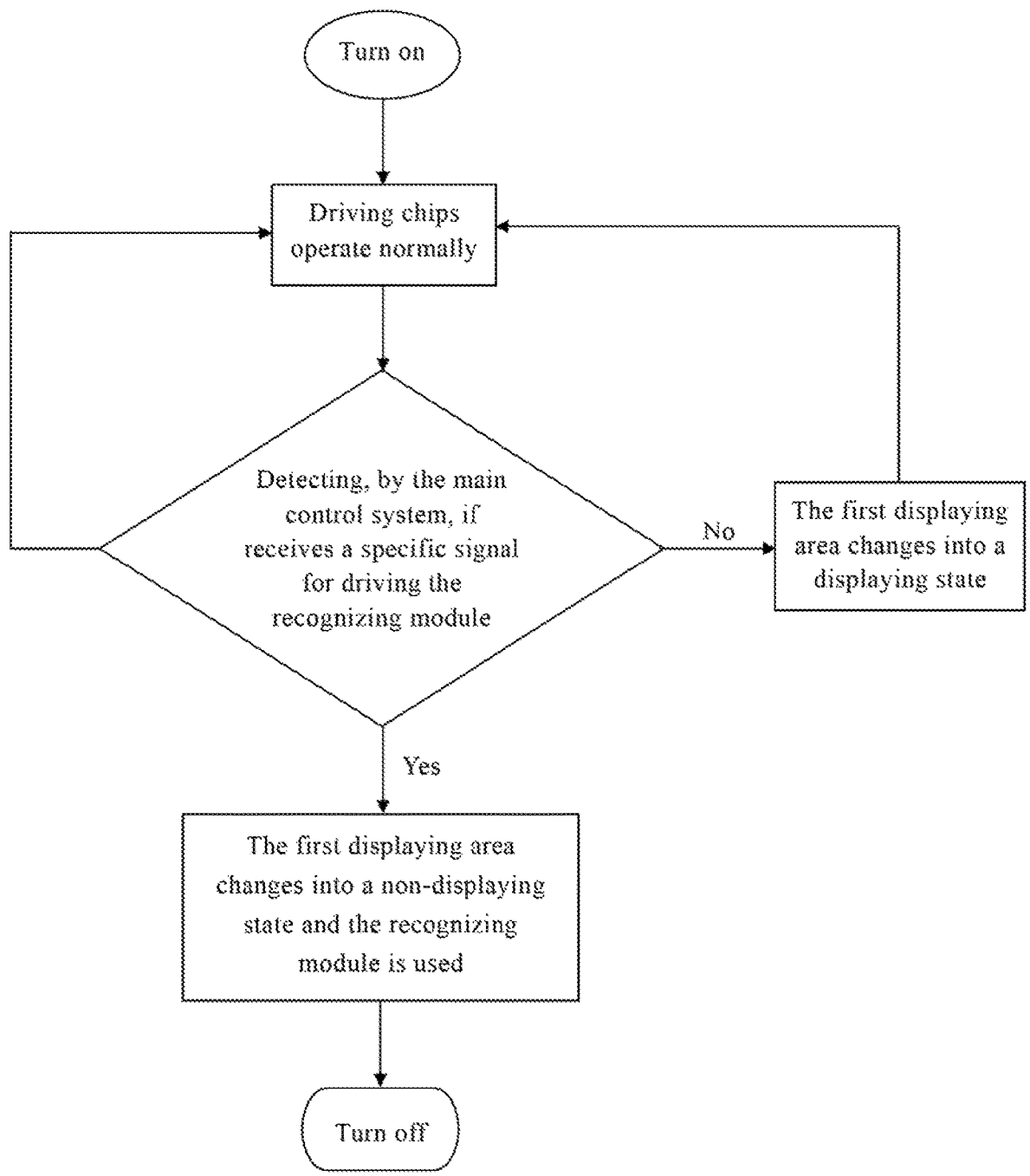
FIG. 3 is a diagram showing an operating principle of a display method of a display device according to an embodiment of the present invention.

Please refer to FIG. 3, which is a diagram showing an operating principle of a display method of a display device according to an embodiment of the present invention. The display method includes the following steps:

Step 10: providing a display device. Please refer to FIG. 1 the display device, in the step, includes a housing 10, a display screen 20, a recognizing module and a main control system, wherein the display screen 20 is located on a surface of the housing 10, and both the recognizing module and the main control system are located between the housing 10 and the display screen 20.

The display screen 20 includes a first displaying area 201 and a second displaying area 202. In an embodiment, the first displaying area 201 is a transparent area, namely a user can see a structure of a module located in the first displaying area 201 when the display device is turned off.

Step 20: detecting, by the main control system, if receives a specific signal for driving the recognizing module.

Step 30: the first displaying area 201 is in a non-displaying state when the main control system receives a specific signal for driving the recognizing module, and the first displaying area 201 is in a displaying state when the main control system does not receive the specific signal for driving the recognizing module.

In the steps of S20 and S30, the first displaying area 201 is in a displaying state when the display device works. In an embodiment, the first displaying area 201 is used to display time, a date, a network status of the display device, any other content with letters, etc.

The main control system receives the specific signal for driving the recognizing module, causing the first displaying area 201 to be in a non-displaying state, when the user uses the recognizing module of the display device. In an embodiment, the recognizing module can be embodied as, without limitation, at least one of a front camera, an infrared camera and a light sensing element.

For instance, the front camera will be used when the user takes a selfie or uses a facial recognition function. At the same time, the first displaying area 201 receives a predetermined signal, causing the first displaying area 201 to be in a non-displaying state and the front camera works.

In an embodiment, in order to realize the image displaying of the display device, the main control system is mainly used for converting a data signal, a control signal and a clock signal from the outside into the ones which are suitable for a Data Driven Integrated Circuit (S-IC) and a Scan Driven Integrated Circuit (G-IC).

In an embodiment, the display device further includes a first driving chip and a second driving chip, wherein the first driving chip is configured for receiving a first signal which is sent from the main control system and is used for driving the first displaying area 201 to display an image, and the second driving chip is configured for receiving a second signal which is sent from the main control system and is used for driving the second displaying area 202 to display the image.

When the user uses the recognizing module of the display device, the main control system receives the specific signal for driving the recognizing module and outputs the first signal to the first driving chip corresponding with the first displaying area 201, causing the first displaying area 201 to be in the non-displaying state.

Please refer to FIG. 2, which is a cross-sectional view along line A-A of the display device shown in FIG. 1. The recognizing module 30 is located in the first displaying area 201, wherein an orthogonal projection of the recognizing module 30 lies within the first displaying area 201 of the display screen 20.

The first displaying area 201 can have, without limitation, a shape of one of a square shape, a rectangle shape or an ellipse shape. In an embodiment, the first displaying area 201 can have a regular rectangle shape.

In an embodiment, the first displaying area 201 is disposed near a frame edge area of the display device. Please refer to FIG. 1, the first displaying area 201 lies in the middle of the top side area of the display device. The first displaying area 201 may also lie in one side of the top side area of the display device.

In an embodiment, the display device further includes a sliding module (not shown) which is connected to the recognizing module 30, wherein the sliding module renders the recognizing module 30 to move toward the display screen 20 when the main control system receives the specific signal for driving the recognizing module 30.

In an embodiment, the first displaying area 201 can be disposed at any position of the display screen 20, without being limited to the forgoing embodiment.

The front camera will be used when the user takes a selfie. At the same time, the first displaying area 201 receives a predetermined signal, causing the first displaying area 201 to be in a non-displaying state. In addition, the sliding module renders the front camera to move toward the display screen 20 after receiving the signal with regard to the utilization of the front camera, so that the front camera can have a wider viewing range to enhance the scope of taking photographs; or when the infrared camera is used, the measuring accuracy of the infrared camera is improved because the distance between the infrared camera and the user is reduced.

In an embodiment, the first displaying area 201 can be a non-transparent area using the same material as the second displaying area 202 used, without being limited to a transparent area.

A display device and a display method are provided in the present disclosure. The display device includes: a housing; a display screen, which is located on a surface of the housing, includes a first displaying area and a second displaying area; a recognizing module which is located between the housing and the display screen; a main control system which is located between the housing and the display screen; wherein the first displaying area is in a non-displaying state when the main control system receives a specific signal for driving the recognizing module, and the first displaying area is in a displaying state when the main control system does not receive the specific signal for driving the recognizing module. Through arranging a first displaying area at the surface of the display screen for displaying permanently, the present disclosure realizes the benefit of increasing the utilization of the non-displaying area of the display screen and improving the user's visual experience.

In conclusion, although the present invention has been described with reference to the foregoing preferred embodiments thereof, it is not limited to the foregoing preferred embodiments. It is apparent to those skilled in the art that a variety of modifications and changes may be made without departing from the scope of the present invention which is intended to be defined by the appended claims.

What is claimed is:

1. A display device, comprising:
    a housing;
    a display screen, which is located on a surface of the housing, includes a first displaying area and a second area;
    a recognizing module which is located between the housing and the display screen;
    a main control system which is located between the housing and the display screen;
    wherein the first displaying area is in a non-displaying state when the main control system receives a specific signal for driving the recognizing module, and the first driving displaying area is in a displaying state when the main control system does not receive the specific signal for driving the recognizing module; and
    wherein the display device further comprises a first driving chip and a second driving chip, and wherein the first driving chip is configured for receiving a first signal which is sent from the main control system and is used for driving the first displaying area to display an image, and the second driving chip is configured for receiving a second signal which is sent from the main control system and is used for driving the second displaying area to display the image.

2. The display device of claim 1, wherein the display device further comprises a sliding module which is connected to the recognizing module; and
    wherein the sliding module renders the recognizing module to move toward the display screen when the main control system receives the specific signal for driving the recognizing module.

3. The display device of claim 1, wherein an orthogonal projection of the recognizing module lies within the first displaying area; and
    wherein the recognizing module is selected from at least one of a front camera, an infrared camera and a light sensing element.

4. The display device of claim 1, wherein the first displaying area has a shape of one of a square shape, a rectangle shape or an ellipse shape; and
    wherein the first displaying area is a transparent area.

5. The display device of claim 1, wherein the first displaying area is disposed near a frame edge area of the display device.

6. A method of displaying in a display device, comprising:
    providing a display device, wherein the display device comprises a housing, a display screen, a recognizing module and a main control system, and wherein both the recognizing module and the main control system are located between the housing and the display screen, and the display screen is located on a surface of the housing and includes a first displaying area and a second displaying area; and
    detecting, by the main control system, upon receiving a specific signal for driving the recognizing module;
    wherein the first displaying area is in a non-displaying state when the main control system receives a specific signal for driving the recognizing module, and the first displaying area is in a displaying state when the main control system does not receive the specific signal for driving the recognizing module; and
    wherein the display device further comprises a first driving chip and a second driving chip, and wherein the first driving chip is configured for receiving a first signal which is sent from the main control system and is used for driving the first displaying area to display an image, and the second driving chip is configured for receiving a second signal which is sent from the main control system and is used for driving the second displaying area to display the image.

7. The method of claim 6, wherein the display device further comprises a sliding module which is connected to the recognizing module; and
    wherein the sliding module renders the recognizing module to move toward the display screen when the main control system receives the specific signal for driving the recognizing module.

8. The method of claim 6, wherein an orthogonal projection of the recognizing module lies within the first displaying area; and
    wherein the recognizing module is selected from at least one of a front camera, an infrared camera and a light sensing element.

9. A display device, comprising:
    a housing;
    a display screen, which is located on a surface of the housing, includes a first displaying area and a second displaying area;
    a recognizing module which is located between the housing and the display screen;
    a main control system which is located between the housing and the display screen;
    wherein the first displaying area is in a non-displaying state when the main control system receives a specific signal for driving the recognizing module, and the first displaying area is in a displaying state when the main control system does not receive the specific signal for driving the recognizing module; and
    wherein the display device further comprises a first driving chip and a second driving chip, and wherein the first driving chip is configured for receiving a first signal which is sent from the main control system and is used for driving the first displaying area to display an image, and the second driving chip is configured for receiving a second signal which is sent from the main control system and is used for driving the second displaying area to display the image.

10. The display device of claim 9, wherein the display device further comprises a sliding module which is connected to the recognizing module; and wherein the sliding module renders the recognizing module to move toward the display screen when the main control system receives the specific signal for driving the recognizing module.

11. The display device of claim 9, wherein an orthogonal projection of the recognizing module lies within the first displaying area; and wherein the recognizing module is selected from at least one of a front camera, an infrared camera and a light sensing element.

12. The display device of claim 9, wherein the first displaying area has a shape of one of a square shape, a rectangle shape or an ellipse shape; and wherein the first displaying area is a transparent area.

13. The display device of claim 9, wherein the first displaying area is disposed near a frame edge area of the display device.

\* \* \* \* \*

UNITED STATES PATENT AND TRADEMARK OFFICE
CERTIFICATE OF CORRECTION

PATENT NO. : 11,069,324 B1
APPLICATION NO. : 16/307146
DATED : July 20, 2021
INVENTOR(S) : Man Li et al.

Page 1 of 1

It is certified that error appears in the above-identified patent and that said Letters Patent is hereby corrected as shown below:

On the Title Page

Item (54) Title and In the Specification, Column 1, Lines 1-2, Delete "DISPLAY DEVICE AND DISPLAY METHOD BACKGROUND OF THE DISCLOSURE" and insert -- DISPLAY DEVICE AND DISPLAY METHOD --.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*